United States Patent [19]

Manning

[11] Patent Number: 5,493,249

[45] Date of Patent: Feb. 20, 1996

[54] SYSTEM POWERED WITH INTER-COUPLED CHARGE PUMPS

[75] Inventor: Troy A. Manning, Boise, Id.

[73] Assignee: Micron Technology, Inc., Boise, Id.

[21] Appl. No.: 164,163

[22] Filed: Dec. 6, 1993

[51] Int. Cl.⁶ .................................................. G05F 1/10
[52] U.S. Cl. .......................... 327/540; 327/538; 327/541; 327/545
[58] Field of Search ................................ 307/264, 296.1, 307/296.2, 296.4, 296.6, 578; 327/306, 323, 331, 390, 538, 540, 541, 543, 545, 546

[56] References Cited

U.S. PATENT DOCUMENTS

| | | | |
|---|---|---|---|
| 4,307,333 | 12/1981 | Hargrove | 323/313 |
| 4,409,496 | 10/1983 | Baba | 307/449 |
| 4,455,628 | 6/1984 | Ozaki et al. | 365/226 |
| 4,460,835 | 7/1984 | Masuoka | 307/296 |
| 4,484,092 | 11/1984 | Campbell, Jr. | 307/578 |
| 4,583,157 | 4/1986 | Kirsch et al. | 307/264 |
| 4,631,421 | 12/1986 | Inoue et al. | 307/296.2 |
| 4,733,108 | 3/1988 | Truong | 307/296.2 |
| 4,807,104 | 2/1989 | Floyd et al. | 363/59 |
| 4,843,256 | 6/1989 | Scade et al. | 307/296.2 |
| 4,961,007 | 10/1990 | Kumanoya et al. | 307/296.2 |
| 4,970,409 | 11/1990 | Wada et al. | 307/264 |
| 5,034,625 | 7/1991 | Min et al. | 307/296.2 |
| 5,179,296 | 1/1993 | Ito | 307/264 |
| 5,196,996 | 3/1993 | Oh | 307/296.2 |
| 5,202,588 | 4/1993 | Matsuo et al. | 307/296.2 |
| 5,266,842 | 11/1993 | Park | 307/296.2 |
| 5,301,097 | 4/1994 | McDaniel | 363/60 |
| 5,304,859 | 4/1994 | Arimoto | 307/296.2 |
| 5,343,088 | 8/1994 | Jeon | 307/296.2 |

FOREIGN PATENT DOCUMENTS

| | | | |
|---|---|---|---|
| 55-25220 | 2/1980 | Japan | 307/296.2 |
| 59-65467 | 4/1984 | Japan | 307/296.2 |
| 2-302076 | 12/1990 | Japan | 307/296.2 |

*Primary Examiner*—Terry Cunningham
*Attorney, Agent, or Firm*—Arnold White & Durkee

[57] ABSTRACT

A multi-phase charge pump continuously pumps to establish a DC voltage outside the range of supply and reference voltages according to the apparatus and methods of the present invention. The multi-phase charge pump in one embodiment includes four stages operating in a ring with a four-phase clock. Each stage includes a three-mode charge pump that generates and provides reset and control signals to other stages. Each stage includes a pass transistor having a gate driven in excess of the DC voltage for efficient transfer of charge. The gate drive signal from a first stage is coupled to a next stage in the ring where it is used to generate the next gate drive signal. Each gate drive signal corresponds to one waveform having a phase skewed in time so that each stage in the ring is operating in a different mode. According to a method of the present invention, a first stepped voltage is developed on a first capacitor and selectively coupled to a second capacitor to develop a second stepped voltage of greater absolute value. The second stepped voltage gates charge transfer from a first stage and enables the selective coupling in a next stage in a sequence of pump stages.

13 Claims, 8 Drawing Sheets

SYSTEM POWERED WITH INTER-COUPLED CHARGE PUMPS

TECHNICAL FIELD

The invention relates to supplying power to a circuit and particularly to systems including pumped power supplies.

BACKGROUND

System designs are routinely constrained by a limited number of power supply voltages. As an example of such a system design, consider a conventional battery powered notebook computer. For proper operation, components of the computer including display, processor, and memory employ several technologies and consequently require power to be supplied at several voltages. The design, therefore, includes power conversion circuitry to efficiently develop voltages in some cases having magnitudes outside the range from zero to the battery voltage or in another case a voltage of reverse polarity. One such power conversion circuit is known as a charge pump.

The demand for high efficiency charge pump circuits has increased with the increasing number of applications for battery powered systems such as notebook computers, portable telephones, security devices, battery backed data storage devices, remote controls, instrumentation, and patient monitors, to name a few.

Inefficiencies in conventional charge pumps lead to reduced system capability and lower system performance. Examples of system capabilities that are adversely affected by such inefficiencies include limited battery life, excess heat generation, and high operating costs. In non-battery operated applications, the latter two limitations also apply. Examples of lower system performance include low speed operation, excessive delays in operation, loss of data, limited communication range, and the inability to operate over wide variations in ambient conditions including ambient light level and temperature.

Conventional pump circuits are characterized by a two part cycle of operation and low duty cycle. Pump operation includes pumping and resetting. Duty cycle is low when pumping occurs at less than 50% of the cycle. Low duty cycle consequently introduces low frequency components into the output DC voltage provided by the pump circuit. Low frequency components cause interference between portions of a system, intermittent failures, and reduced system reliability. Some systems employing conventional pump circuits include filtering circuits at additional cost, circuits to operate the pump at elevated frequency, or both. Elevated frequency operation in some cases leads to increased system power dissipation with attendant adverse effects.

In addition to constraints on the number of power supply voltages available for system design, there is an increasing demand for reducing the magnitude of the power supply voltage. The demand in diverse applications areas could be met with high efficiency charge pumps that operate from a supply voltage of less than 5 volts.

Such applications include memory systems backed by 3 volt standby supplies, processors and other integrated circuits that require either reverse polarity substrate biasing or boosted voltages outside the range 0 to 3 volts for improved operation. As supply voltage is reduced, further reduction in the size of switching components paves the way for new and more sophisticated applications. Consequently, the need for high efficiency charge pumps is increased because voltages necessary for portions of integrated circuits and other system components are more likely to be outside a smaller range.

In view of the problems described above and related problems that consequently become apparent to those skilled in the applicable arts, the need remains, in methods for supplying power to a circuit and particularly in systems including pumped power supplies, for alternatives to the conventional pump circuit having low efficiency, low duty cycle operation, and only practically operable from voltages of 5 volts and above.

SUMMARY

Accordingly, a system in one embodiment of the present invention includes an operational circuit and a voltage generator for supplying power to the operational circuit. The voltage generator includes an oscillator, and a plurality of charge pump circuits forming one multi-phase charge pump. In operation, each pump circuit of the plurality, in response to the oscillator, provides power to the operational circuit for a time, and enables a next pump circuit of the plurality to supply power at another time.

According to a first aspect of such a system, power is supplied to the operational circuit in a manner characterized by continuous pumping, thereby supplying higher currents.

According to another aspect, the plurality of pumps cooperate to provide a 100% pumping duty cycle. Switching artifacts, if any, on the pumped DC voltage supplied to the operational circuit are of lower magnitude and are at a frequency more easily removed from the pumped DC voltage.

According to another aspect, a signal in a first pump circuit is generated for enabling a second pump circuit of the plurality. By using the generated signal for pump functions in a first pump and for enabling a second pump, additional signal generating circuitry in each pump is avoided.

According to another embodiment of the present invention, each pump circuit includes a pass transistor for selectively coupling a charged capacitor to the operational circuit when enabled by a control signal. By selectively coupling, each pump circuit is isolated at a time when the pump is no longer efficiently supplying power to the operational circuit.

According to another aspect, each pump of the plurality operates at improved efficiency compared to prior art pumps, especially in MOS integrated circuit applications wherein the margin between the power supply voltage ($V_{CC}$) and the threshold voltage ($V_T$) of the pass transistor is less than about 0.6 volts. Greater efficiency is achieved by driving the pass transistor gate at a voltage further out of the range between ground and $V_{CC}$ voltages than the desired pumped voltage is outside such range.

According to another aspect of such an embodiment, the control signal is developed as a result of developing a first stepped voltage and using the first stepped voltage to develop a second stepped voltage of increased absolute value.

In yet another embodiment, an integrated circuit includes a multi-phase charge pump, each stage of which includes an FET as a pass transistor. The substrate of the integrated circuit is pumped to a bias voltage having a polarity opposite the polarity of the power signal, $V_{CC}$, from which the integrated circuit operates. By developing a control signal as the result of a first stepped voltage and a second stepped voltage, and applying the control signal to the gate of the FET, efficient coupling of a pumped charge to the substrate results.

The present invention may be practiced according to a method for powering a circuit, the method in one embodiment includes the steps of:

(1) maintaining a first voltage on a first plate of a first capacitor while storing a first charge on a second plate of the first capacitor;

(2) stepping the voltage on the first plate of the first capacitor thereby developing a first stepped voltage on the second plate of the first capacitor;

(3) coupling the first stepped voltage to a pass transistor for selective conduction to the circuit;

(4) maintaining a second voltage on a first plate of a second capacitor while storing a second charge on a second plate of the second capacitor;

(5) stepping the voltage on the first plate of the second capacitor thereby developing a second stepped voltage on the second plate of the second capacitor;

(6) coupling the second stepped voltage to the first plate of a third capacitor;

(7) stepping the voltage on the second plate of the third capacitor thereby developing a third stepped voltage on the first plate of the third capacitor; and (8) coupling the third stepped voltage to a control terminal of the pass transistor thereby selectively enabling the first stepped voltage to power the circuit.

According to a first aspect of such a method as applied to a substrate bias generator of an integrated circuit, the control terminal of the pass transistor is taken to a voltage having sufficient magnitude for efficient biasing of the substrate through the pass transistor.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

In each functional block diagram, a single line with an arrow represents a group of signals. A single line between functional blocks represents one or more signals coupled in any manner by any number of conductors.

Signals that appear on several figures and have the same mnemonic are directly or indirectly coupled together. A signal named with a mnemonic and a second signal named with the same mnemonic followed by an asterisk are related by logic inversion In each timing diagram the vertical axis represents analog voltage levels for analog signals and binary logic levels for logic signals. The horizontal axis represents time. A person having ordinary skill in the art will recognize where portions of a diagram have been expanded to improve the clarity of the presentation. The vertical axis is intended to show the transition from active (asserted) to passive (non-asserted) levels for each logic signal and a summary of characteristic values for each analog signal. The voltages corresponding to the logic levels of the various signals are not necessarily identical among the various logic signals.

Description

Figure 1:
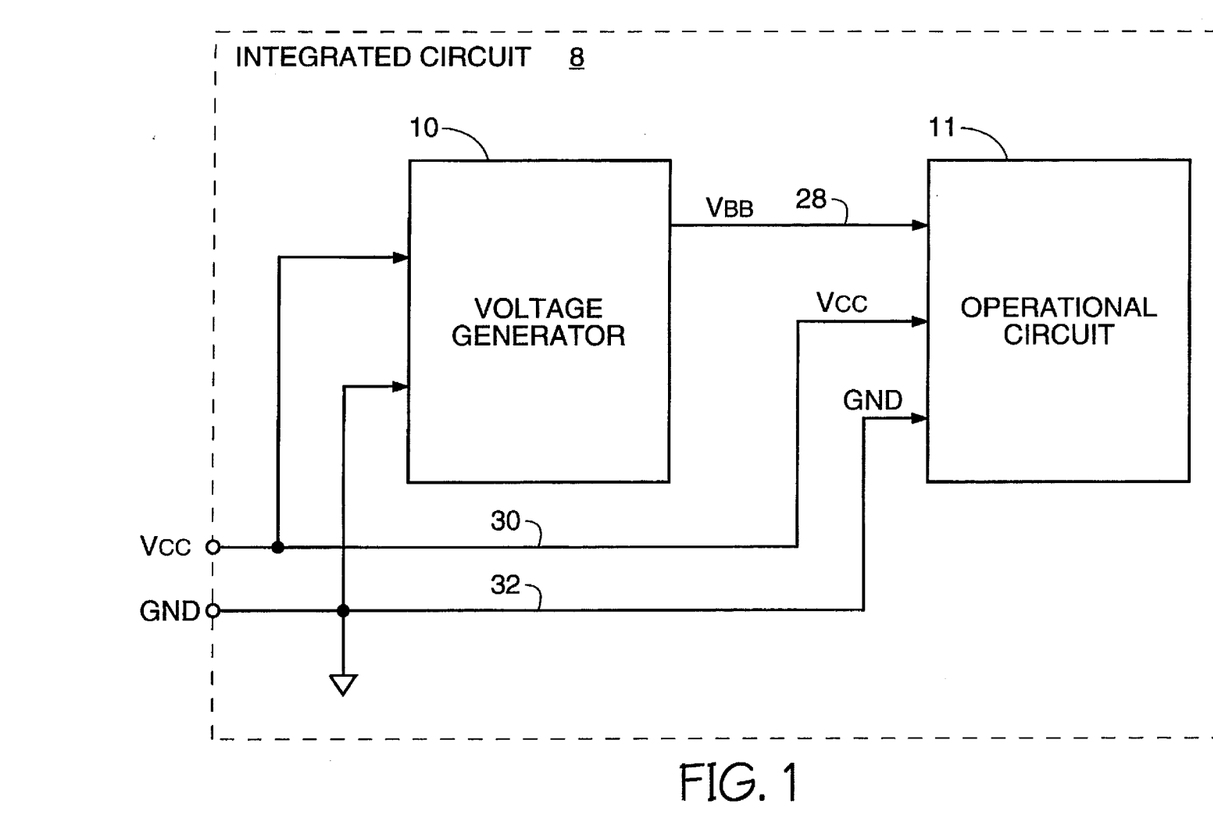
FIG. 1 is a functional block diagram of an integrated circuit of the present invention.

FIG. 1 is a functional block diagram of an integrated circuit of the present invention. Integrated circuit 8 includes voltage generator 10 and operational circuit 11 formed on a substrate. Integrated circuit 8 receives a power signal $V_{CC}$ on line 30 and a ground reference signal GND on line 32. A DC voltage therebetween provides operating current to voltage generator 10 and operational circuit 11, thereby powering integrated circuit 8.

Power supplied to integrated circuit 8 is converted by voltage generator 10 to an intermediate voltage $V_{BB}$. The voltage of signal $V_{BB}$ has a magnitude outside the range from GND to $V_{CC}$. For example, when the voltage of signal $V_{CC}$ is 3.3 volts referenced to GND, the voltage of signal $V_{BB}$ in one embodiment is about −1.5 volts and in another embodiment is about −5.0 volts. Voltages of opposite polarity are used as substrate bias voltages for biasing the substrate in one embodiment wherein integrated circuit 8 is fabricated with a MOS or CMOS process. Further, when the voltage of signal $V_{CC}$ is 3.3 volts referenced to GND, the voltage of signal $V_{BB}$ in still another embodiment, is about 4.0 volts. Voltages in excess of $V_{CC}$ are called boosted and are used, for example, in memories for improved access speed and more reliable data storage.

Operational circuit 11 performs a function of integrated circuit 8. The present invention is independent of the nature of the function performed. Examples of the wide variety of possible functions include data processing, computing, data storage, measurement, control, display, sensing, timing, switching, amplification, and communication functions.

Integrated circuit 8 is an example of a system of the present invention that includes a power supply for generating a voltage for use in the system. The voltage generator in such a system generates a pumped signal that may be used to provide power or to bias other portions of the system, used as a reference for system functions, or used to control the operation of portions of the system. In systems of the present invention, the voltage generator provides a voltage for use in the system that is outside the range of voltages supplied to the system.

Figure 2:
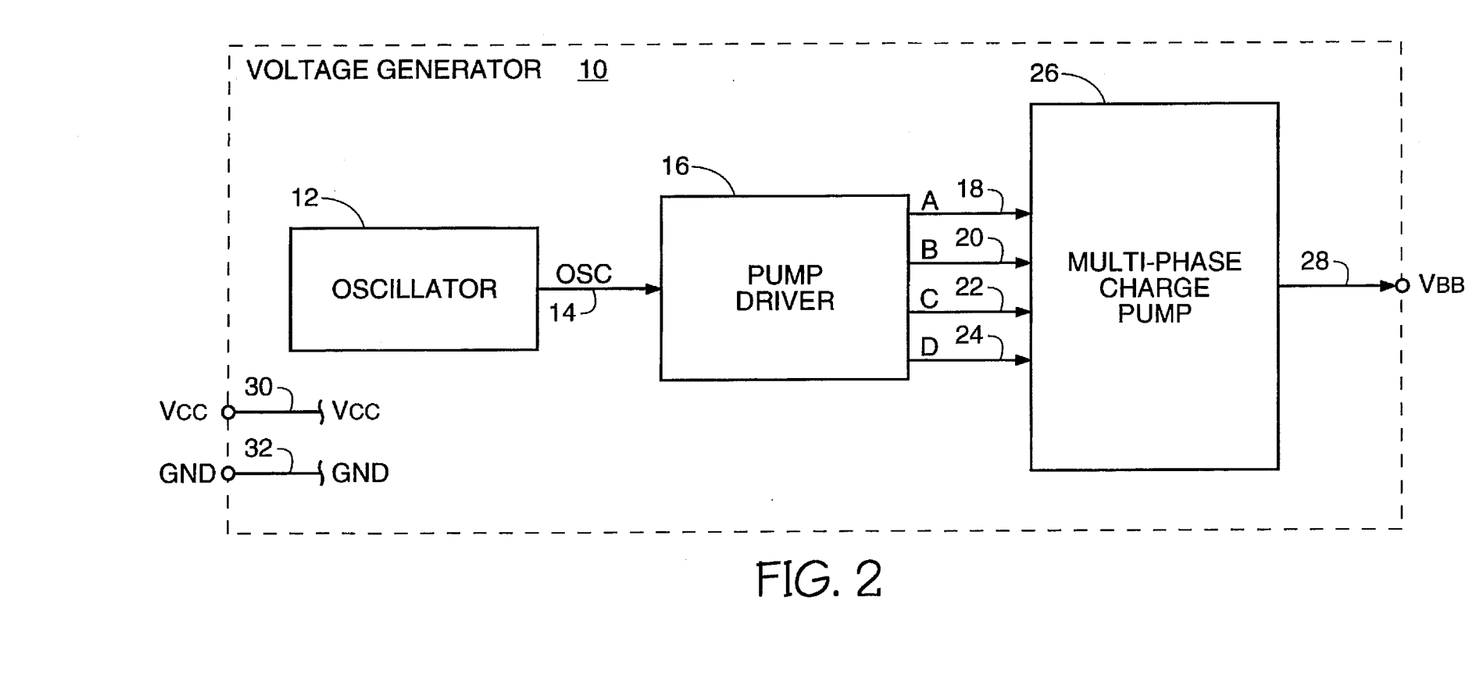
FIG. 2 is a functional block diagram of voltage generator 10 shown in FIG. 1.

FIG. 2 is a functional block diagram of voltage generator 10 shown in FIG. 1. Voltage generator 10 receives power and reference signals $V_{CC}$ and GND on lines 30 and 32, respectively, for operating oscillator 12, pump driver 16, and multi-phase charge pump 26. Oscillator 12 generates a timing signal OSC on line 14 coupled to pump driver 16. Control circuits, not shown, selectively enable oscillator 12 in response to an error measured between the voltage of signal $V_{BB}$ and a target value. Thus, when the voltage of signal $V_{BB}$ is not within an appropriate margin of the target value, the oscillator is enabled for reducing the error. The oscillator is then disabled until the voltage of signal $V_{BB}$ again is not within the margin.

Pump driver 16, in response to signal OSC on line 14, generates timing signals A, B, C, and D, on lines 18–24, respectively. Pump driver 16 serves as clocking means coupled in series between oscillator 12 and multi-phase charge pump 26. Timing signals A, B, C, and D are non-overlapping. Together they organize the operation of multi-phase charge pump 26 according to four clock phases. Separation of the phases is better understood from a timing diagram.

Figure 3:
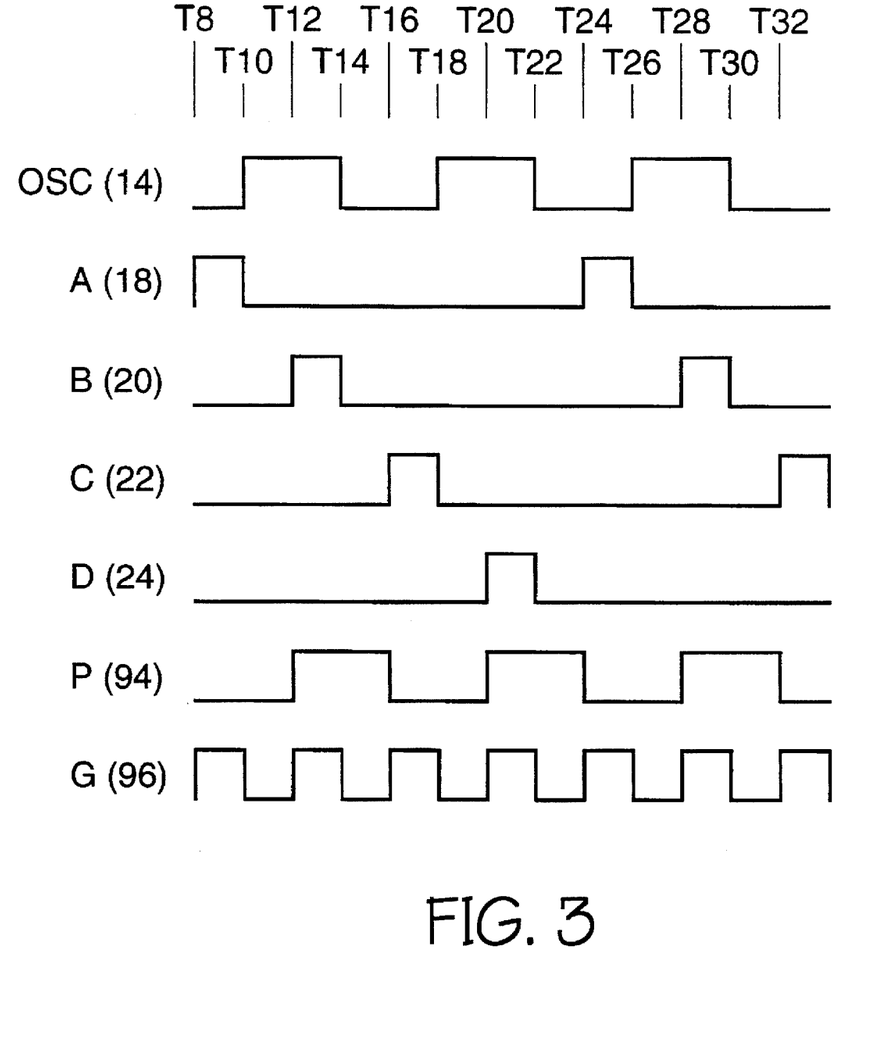
FIG. 3 is a timing diagram of signals shown on FIGS. 2 and 4.
Figure 4:
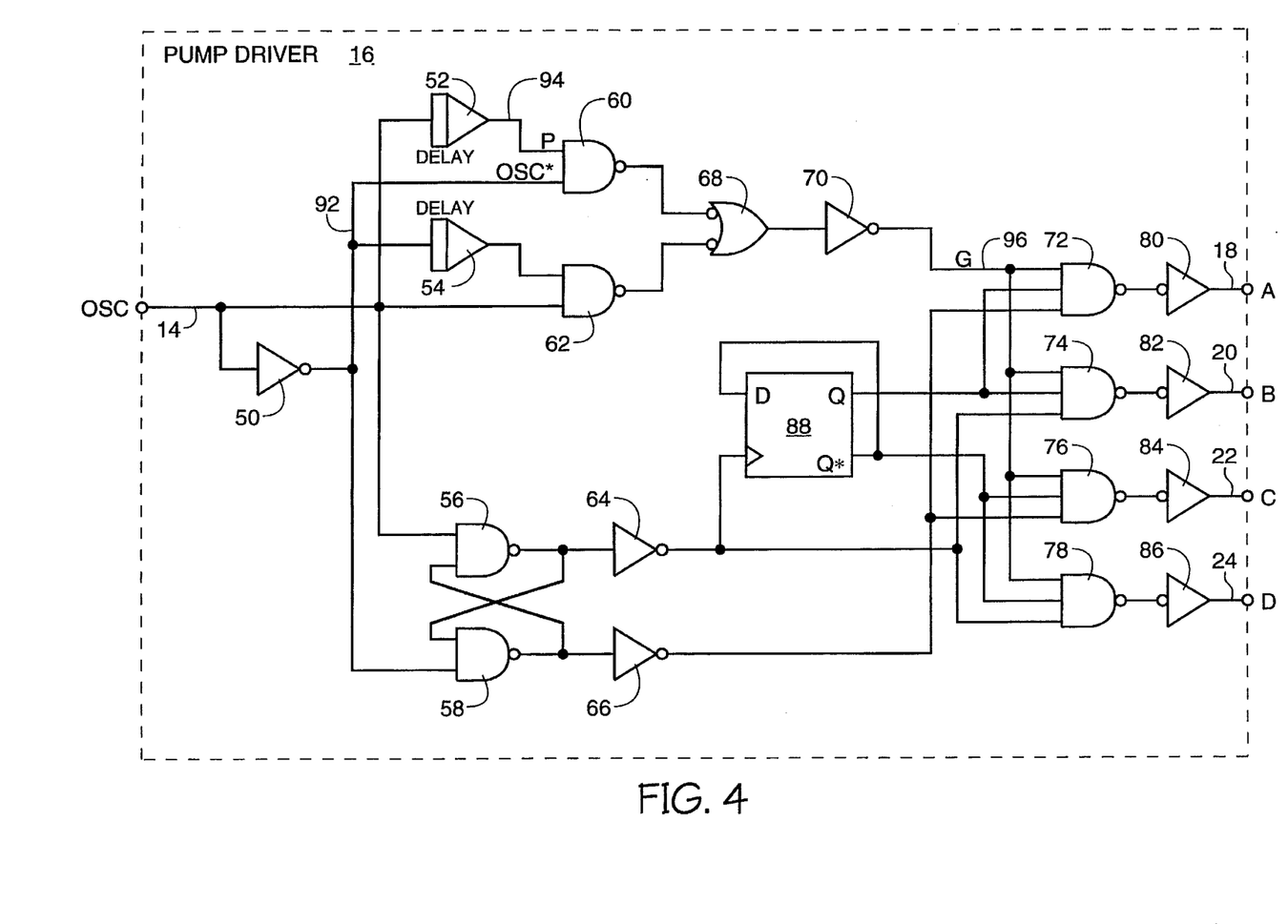
FIG. 4 is a schematic diagram of pump driver 16 shown on FIG. 2.

FIG. 3 is a timing diagram of signals shown on FIGS. 2 and 4. Timing signals A, B, C, and D, also called clock signals, are non-overlapping logic signals generated from intermediate signals P and G. Signal OSC is an oscillating logic waveform. Signal P is the delayed waveform of signal OSC. Signal G is the logic exclusive OR of signals OSC and P. The extent of the delay between signals OSC and P determines the guard time between consecutively occurring timing signals A, B, C, and D. The extent of delay is exaggerated for clarity. In one embodiment, signal OSC oscillates at about 40 MHz and the guard time is about 3 nanoseconds. Signal transitions at particular times will be discussed with reference to a schematic diagram of an implementation of the pump driver.

FIG. 4 is a schematic diagram of pump driver 16 shown on FIG. 2. Pump driver 16 includes means for generating gate signal G on line 96; a first flip flop formed from gates 56, 58, 64, and 66; a second flip flop 88; and combinational logic.

Signal G on line 96 operates to define non-overlapping timing signals. Means for generating signal G include gate 50, delay elements 52 and 54, and gates 60, 62, 68, and 70. Delay elements 50 and 54 generate signals skewed equally in time. Referring to FIG. 3, signal OSC rises at time T10. At time T12, signal P on line 94 rises after the delay accomplished by element 52. Inverted oscillator signal OSC* on line 92 is similarly delayed through element 54. The remaining gates form signal G from the logic exclusive OR of signal OSC and signal P according to principles well known in the art. Signal G on line 96 rises and remains high from time T12 to time T14 so that one of the four flip flop outputs drives one of the timing signal lines 18–24. First and second flip flops operate to divide signal OSC by four to form symmetric binary oscillating waveforms on flip flop outputs from gates 64 and 66 and from flip flop 88. The logic combination of appropriate flip flop outputs and signal G produces, through gates 72–78, the non-overlapping timing signals A, B, C, and D as shown in FIG. 3. Gates 80–86 provide buffering to improve drive characteristics, and invert and provide signals generated by gates 72–78 to charge pump circuits to be discussed below. Buffering overcomes intrinsic capacitance associated with layout of the coupling circuitry between pump driver 16 and multi-phase charge pump 26, shown in FIG. 2.

Figure 5:
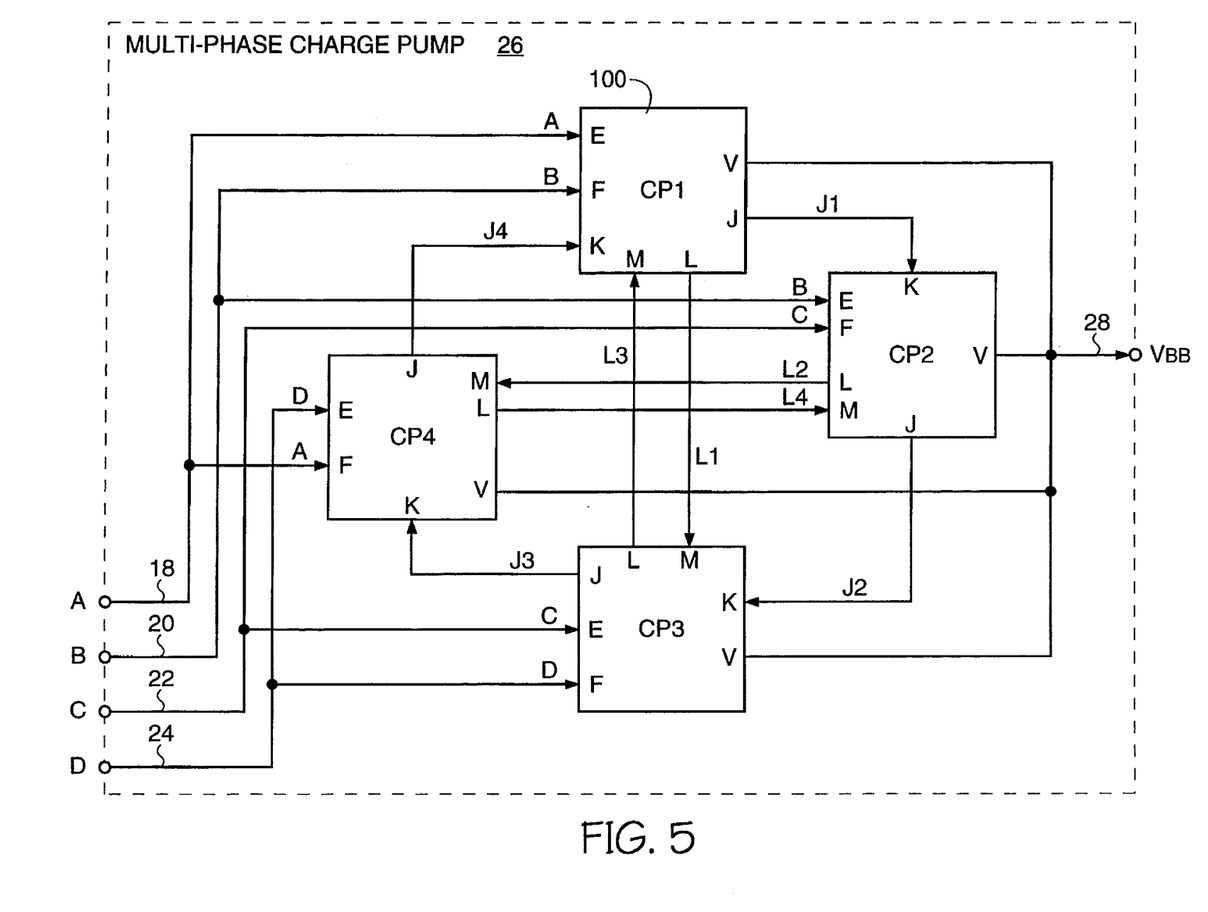
FIG. 5 is a functional block diagram of multi-phase charge pump 26 shown in FIG. 2.

FIG. 5 is a functional block diagram of multi-phase charge pump 26 shown in FIG. 2. Multi-phase charge pump 26 includes four identical charge pump circuits identified as charge pumps CP1–CP4 and inter-connected in a ring by signals J1–J4. The output of each charge pump is connected in parallel to line 28 so that signal $V_{BB}$ is formed by the cooperation of charge pumps CP1–CP4. Timing signals A, B, C, and D are coupled to inputs E and F of each charge pump in a manner wherein no charge pump receives the same combination of timing signals. Consequently, operations performed by charge pump CP1 in response to timing signals A and B at a first time shown in FIG. 3 from time T8 to time T14 will correspond to operations performed by charge pump CP2 at a second time from time T12 to time T18.

Each charge pump has a mode of operation during which primarily one of three functions is performed: reset, share, and drive. Table 1 illustrates the mode of operation for each charge pump during the times shown on FIG. 3. During the

|        |         | Mode of Operation |       |       |       |
|--------|---------|-------|-------|-------|-------|
| Period | Times   | CP1   | CP2   | CP3   | CP4   |
| 1      | T14–T18 | reset | drive | share | reset |
| 2      | T18–T22 | reset | reset | drive | share |
| 3      | T22–T26 | share | reset | reset | drive |
| 4      | T26–T30 | drive | share | reset | reset | reset mode, storage elements in the charge pump are set to conditions in preparation for the share mode. In the share mode, charge is shared among storage elements to develop voltages needed during the drive mode. During the drive mode, a charge storage element that has been pumped to a voltage designed to establish the voltage of signal $V_{BB}$ within an appropriate margin is coupled to line 28 to power operational circuit 11.

Power is supplied via line 28 by multi-phase charge pump 26 as each charge pump operates in drive mode. Each charge pump is isolated from line 28 when in reset and share modes. As will be discussed in greater detail with reference to FIG. 7, each charge pump generates a signal for enabling another pump of multi-phase charge pump 26 to supply power. Such a signal, as illustrated in FIG. 5 includes two signals, J and L, generated by each pump. In alternate embodiments, enablement is accomplished by one or more signals individually or in combination.

Enabling a charge pump in one embodiment includes enabling the selective coupling of a next pump to line 28. In other alternate embodiments, enabling includes providing a signal for selectively controlling the mode of operation or selectively controlling the function completed during a mode of operation, or both. Such control is accomplished by generating and providing a signal whose function is not primarily to provide operating power to another pump.

Charge pumps CP1–CP4 are arranged in a sequence having "next" and "prior" relations among charge pumps. Because charge pump CP2 receives a signal J1 generated by charge pump CP1, charge pump CP1 is the immediately prior pump of CP2 and, equivalently, CP2 is the immediately next pump of CP1. In a like manner, with respect to signal J2, charge pump CP3 is the immediately next pump of CP2. Further, CP3 is a next pump of the immediate next pump of CP1. With respect to signals J3 and J4, and by virtue of the fact that signal J1–J4 form a ring, charge pump CP4 is the immediately prior pump of CP1 and charge pump CP3 is a prior pump of the immediate prior pump of CP1. Signals L1–L4 are coupled to pumps beyond the immediate next pump. Consequently, charge pump CP3 receives signal L1 from a prior pump (CP1) of the prior pump CP2; and provides signal L3 to a next pump (CP1) of the next pump CP4. Charge pumps CP1–CP4 are numbered according to their respective sequential positions 1–4 in the ring.

In alternate embodiments, one or more additional charge pumps are coupled between a given charge pump and a next charge pump without departing from the concept of "next pump" taught herein. A next pump need not be an immediate next pump. A prior pump, likewise, need not be an immediately prior pump.

The operation of each charge pump, e.g. CP1, is coordinated by timing signals received at inputs E and F, timing signals received at inputs M and K. Due to the fact that pump circuits are identical and that timing signals A–D are coupled to define four time periods, each period including two clock phases, signals J1–J4 all have the same characteristic waveform, occurring at a time according to the sequential position 1–4 of the pump from which each signal is generated. Signals L1–L4, in like manner, all have a second characteristic waveform, occurring according to the generating charge pump's sequential position.

In an alternate and equivalent embodiment, the sequence of charge pumps illustrated as CP1–CP4 in FIG. 5 does not form a ring. The first pump in the sequence does not receive a signal generated by the last charge pump in the sequence. The sequence in other equivalent embodiments includes fewer or more than four charge pumps. Those skilled in the art can apply the principles of the present invention to various organizations and quantities of cooperating charge pumps without departing from the scope of the present invention. In an alternate embodiment, for example, an alternate pump driver provides a three phase timing scheme with three clock signals similar to signals A–C. An alternate multi-phase charge pump in such an embodiment includes six charge pumps in three pairs arranged in a linear sequence coupled in parallel to supply signal $V_{BB}$.

In yet another alternate embodiment, the timing and intermittent operation functions of oscillator 12 are implemented by a multi-stage timing circuit formed in a series of stages, each charge pump including one stage. In such an embodiment, the multi-stage timing circuit performs the functions of pump driver 16. The multi-stage timing circuit is implemented in one embodiment with delay elements arranged with positive feedback. In another embodiment, each stage includes a retriggerable monostable multivibrator. In still another embodiment, delay elements sense an error measured between the voltage of signal $V_{BB}$ and a target value. In yet another embodiment, less than all charge pumps include a stage of the multi-stage timing circuit.

Figure 6:
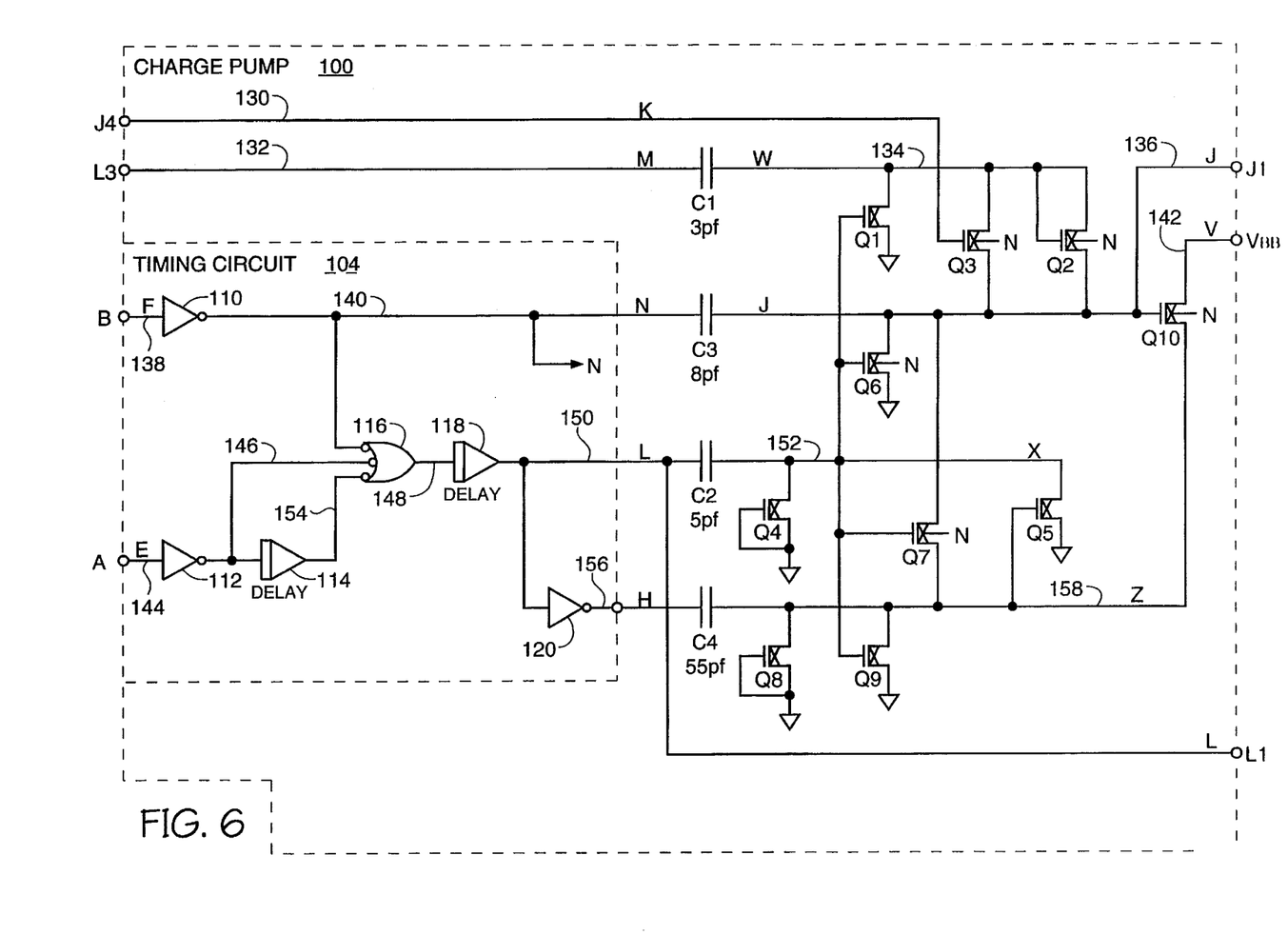
FIG. 6 is a schematic diagram of charge pump 100 shown in FIG. 5.

FIG. 6 is a schematic diagram of charge pump 100 shown in FIG. 5. Charge pump 100 includes timing circuit 104; means for establishing start-up conditions (Q4 and Q8); primary storage means (C4); control means responsive to timing signal K for generating a second timing signal J (Q2 and Q3); transfer means responsive to signals M and N for selectively transferring charge from the primary storage means to the operational circuit (C1, C3, Q2, Q3, and Q10); and reset means, responsive to timing signal L, for establishing charges on each capacitor in preparation for a subsequent mode of operation (C2, Q1, Q6, Q7, Q9, and Q5).

Values of components shown in FIG. 6 illustrate one embodiment of the present invention, an integrated circuit dynamic random access memory (DRAM) having a voltage generator for supplying a substrate bias voltage. In such an embodiment $V_{CC}$ is about 3.0 volts, $V_{BB}$ is about −1.2 volts, signal OSC has a frequency of 40 MHz and each pump circuit (e.g., CP1) supplies about 5 milliamps in drive mode. In similar embodiments the frequency of signal OSC is in the range 1 to 50 MHz and each pump circuit supplies current in the range 1 to 10 milliamps.

Simulation analysis of charge pump 100 using the component values illustrated in FIG. 6 shows that for $V_{CC}$ as low as 1.7 volts and $V_T$ of about 1 volt, an output current of about 1 milliamp is generated. Not only do prior art pumps cease operating at such low values of $V_{CC}$, but output current is about five times lower. A prior art pump operating at a minimum $V_{CC}$ of 2 volts generates only 100–200 microamps.

P-channel transistors Q2, Q3, Q6, Q7, and Q10 are formed in a well biased by signal N. The bias decreases the voltages apparent across junctions of each transistor, allowing smaller dimensions for these transistors.

A modified charge pump having an output voltage $V_{BB}$ greater than $V_{CC}$ includes N-channel transistors for all P-channel transistors shown in FIG. 6. Proper drive signals N, L, and H are obtained by introducing logic inverters on each line 140, 150, and 156. In such an embodiment, signal N is not used for biasing wells of the pump circuit since no transistor of this embodiment need be formed in a well.

Charge pump 100 corresponds to charge pump CP1 and is identical to charge pumps CP2–CP4. Signals on FIG. 6 outside the dotted line correspond to the connections for CP1 shown on FIG. 5. The numeric suffix on each signal name indicates the sequential position of the pump circuit that generated the signal. For example, signal K received as signal J4 on line 130 is generated as signal J by charge pump CP4. Likewise, signal M received as signal L3 on line 132 is generated as signal L by charge pump CP3.

When power signal $V_{CC}$ and reference signal GND are first applied, transistors Q4 and Q8 bleed residual charge off capacitors C2 and C4 respectively. Since the functions of transistors Q4 and Q8 are in part redundant, either can be eliminated, though start up time will increase. The first several oscillations of signal OSC eventually generate pulses on signals A, B, C, and D. Signals C and D, coupled to the equivalent of timing circuit 104 in charge pump CP3, form signal L3 input to CP1 as signal M. Signals D and A, coupled to the equivalent of timing circuit 104 in charge pump CP4, contribute to the formation of signal J4. In approximately two occurrences of each signal A–D, all four charge pumps are operating at steady state signal levels. Steady state operation of charge pump 100 in response to input timing and control signals J4 (K) and L3 (M), and clock signals A (E) and B (F) is best understood from a timing diagram.

Figure 7:
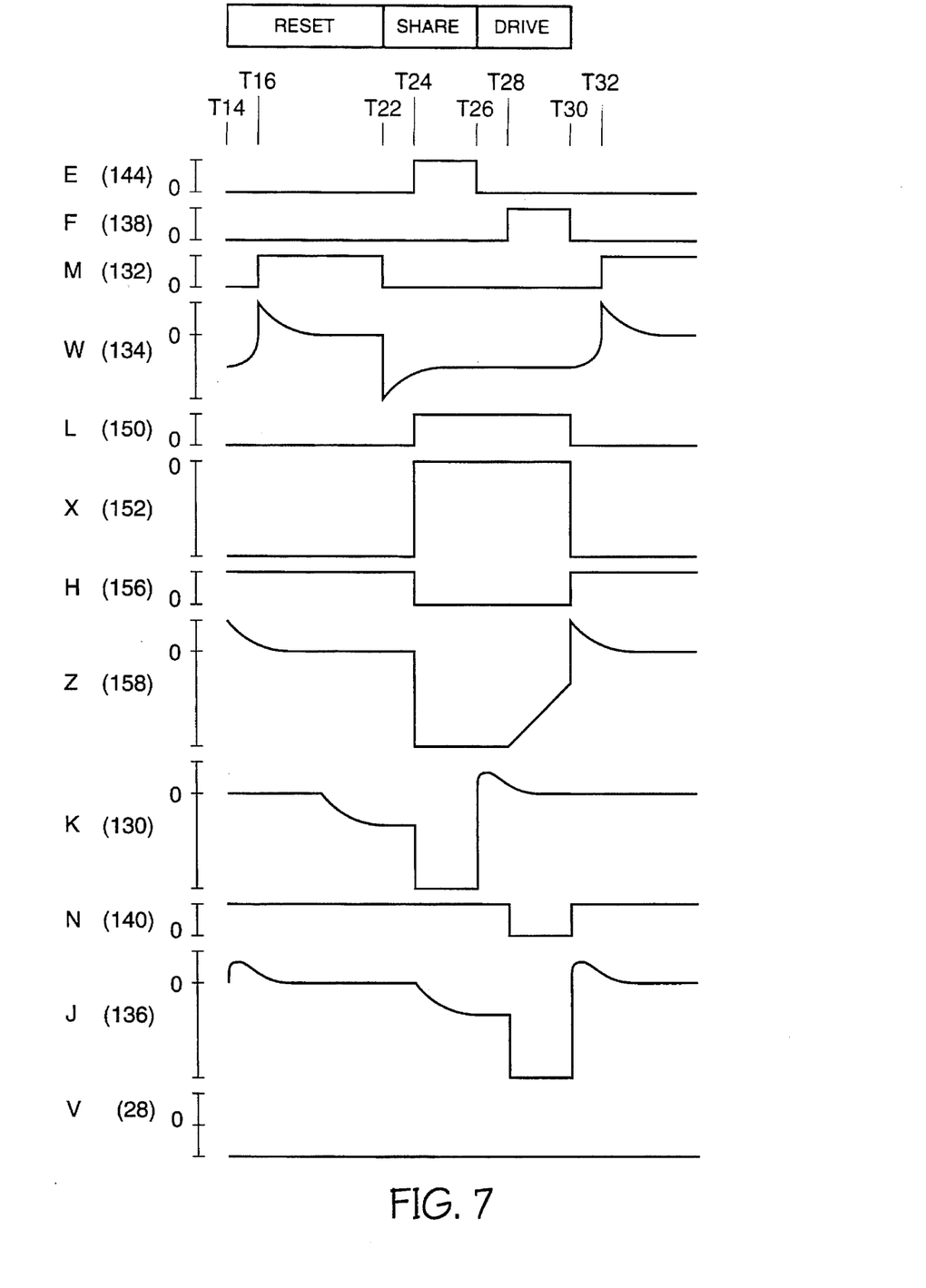
FIG. 7 is a timing diagram of signals shown in FIG. 6.

FIG. 7 is a timing diagram of signals shown in FIG. 6. The times identified on FIG. 7 correspond to similarly identified times on FIG. 3. In addition, events at time T32 corresponds to events at time T16 due to the cyclic operation of multiphase charge pump 26 of which charge pump 100 is a part.

During the period from time T14 to time T22, pump 100 performs functions of reset mode. At time T14, signal X falls turning on reset transistors Q1, Q6, Q7, and Q9. Transistor Q1 draws the voltage on line 134 to ground as indicated by signal W. Transistor Q6 when on draws the voltage of signal J to ground. Transistor Q9 when on draws the voltage of signal Z to ground. Transistor Q7 couples capacitors C3 and C4 so that signal Z is drawn more quickly to ground. In an alternate embodiment, one of transistors Q6, Q7, and Q9 is eliminated to trade-off efficiency for reduced circuit complexity. In an alternate embodiment, additional circuitry couples a part of the residual charge of capacitors C1 and C3 to line 142 as a design trade-off of circuit simplicity for improved efficiency. Such additional circuitry includes timing signal generation and pass transistor circuitry known to those skilled in the art.

At time T16 pump 100 receives signal M on line 132. Consequently, capacitor C1, charges as indicated by signal W.

During the period from time T22 to time T26 charge pump 100 performs functions of share mode. At time T22, signal M falls and capacitor C1 discharges slightly until at time T24 signal L rises. As a consequence of the rising edge of signal L, signal X rises, turning off transistor Q1 by time T24. The extent of the discharge can be reduced by minimizing the dimensions of transistor Q1. By stepping the voltage of signal M at time T22, a first stepped signal W having a voltage below ground has been established.

At time T24, signal K falls, turning transistor Q3 on so that charges stored on capacitors C1 and C3 are shared, i.e. transferred in part therebetween. The extent of charge sharing is indicated by the voltage of signal J. The voltage of signal J at time T28 is adjusted by choosing the ratio of values for capacitors C1 and C3. Charge sharing also occurs through transistor Q2 which acts as a diode to conduct current from C3 to C1 when the voltage of signal J is more positive than the voltage of signal W. Transistor Q2 is eliminated in an alternate embodiment to trade-off efficiency for reduced circuit complexity.

Also at time T24, signal H falls. By stepping the voltage of signal H, a second stepped signal Z having a voltage below ground has been established. Until time T28, transistor Q10 is off, isolating charge pump 100 and signal Z from line 142. While signal Z is low, transistor Q5 is turned on to draw signal X to ground. Signals L and H cooperate to force signal X to ground quickly.

At time T26, signal K rises, turning off transistor Q3. The period of time between non-overlapping clock signals E and F provides a delay between the rising edge of signal K at time T26 and the falling edge of signal N at time T28. By turning transistor Q3 off at time T26, capacitors C1 and C3 are fully isolated from each other by time T28 so that the effectiveness of signal N on signal J is not compromised.

During the period from time T28 to time T32, charge pump 100 performs functions of drive mode. At time T28 signal N falls. By stepping the voltage of signal N, a third stepped signal J is established at a voltage below the voltage of signal Z. Consequently, transistor Q10 turns on and remains on until time T30. Stepped signal J, coupled to the gate of pass transistor Q10, enables efficient conduction of charge from capacitor C4 to line 142 thereby supplying power from a first time T28 to a second time T30 as indicated by the voltage of signal Z. The voltage of the resulting signal $V_{BB}$ remains constant due to the large capacitive load of the substrate of integrated circuit 8. Q10 operates as pass means for selectively conducting charge between C4 and the operational circuit coupled to line 142, in this case the substrate. In alternate and equivalent embodiments, pass means includes a bipolar transistor in addition to, or in place of, field effect transistor Q10. In yet another alternate embodiment, pass means includes a switching circuit.

The waveform of signal J, when used as signal K in a next pump of the sequence, enables some of the functions of share mode in the next pump. As used in charge pump 100, signal J is a timing signal for selectively transferring charge from charge pump 100 and between capacitors C1 and C3. By generating signal J in a manner allowing it to perform several functions, additional signals and generating circuitry therefor are avoided.

At time T30, signal F falls. Consequently, signal L falls, signal H rises, and signal N rises. Responsive to signal H, capacitor C4 recharges as indicated by the voltage of signal Z. Responsive to signals N and L, capacitors C1 and C3 begin resetting as indicated by the voltage of signal J at time T30 and equivalently, time T14.

During share and drive modes, charge pump 100 generates signal L for use as signal M in a next pump of the next pump of charge pump 100. The waveform of signal L when high disables reset functions in share and drive modes of charge pump 100 and when used as signal M in another pump, enables functions of reset mode therein. By generating signal L in a manner allowing it to perform several functions, additional signals and generating circuitry therefor are avoided.

Timing circuit 104 includes buffers 110, 112, and 120; gate 116; and delay elements 114 and 118. Buffers provide logical inversion and increased drive capability. Delay element 114 and gate 116 cooperate as means for generating timing signal L having a waveform shown on FIG. 7. Delay element 118 ensures that signal N falls before signal L falls to preserve the effectiveness of signal J at time T30.

Figure 8:
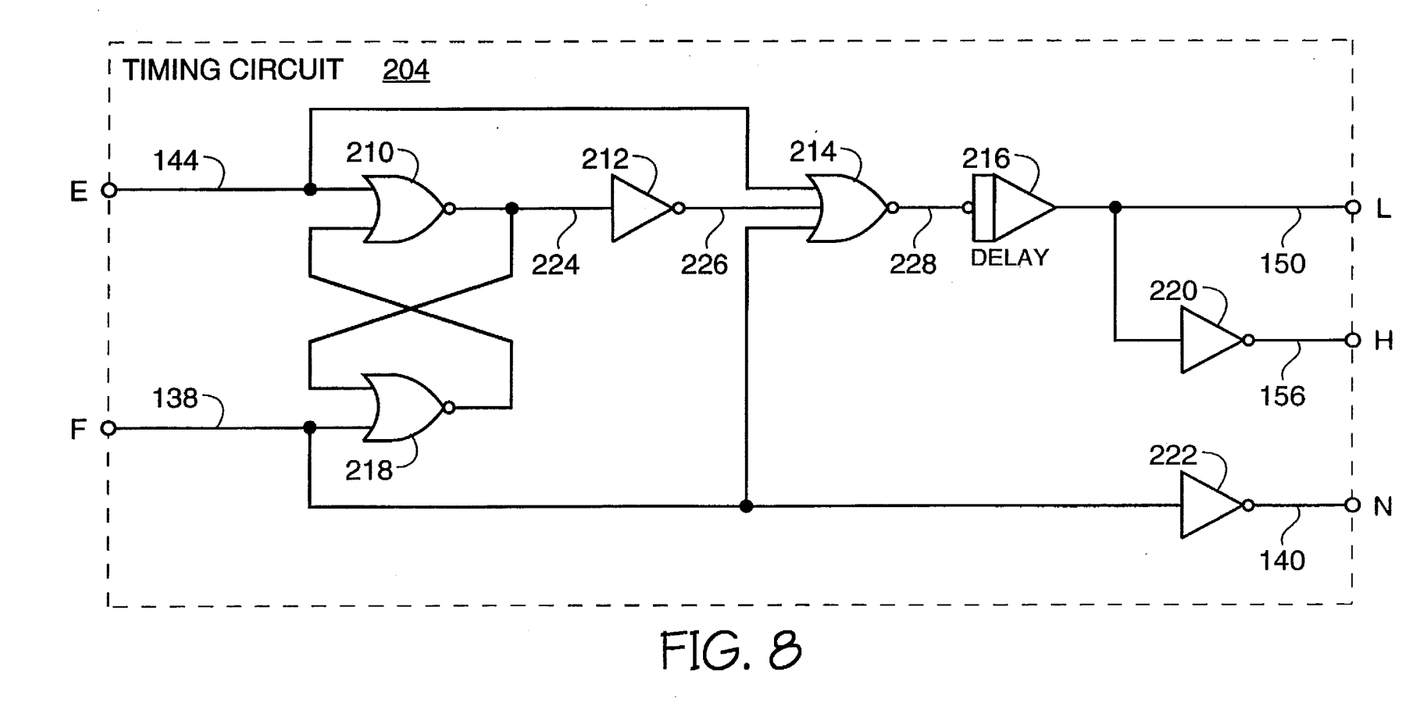
FIG. 8 is a schematic diagram of a timing circuit alternate to timing circuit 104 shown in FIG. 6.

FIG. 8 is a schematic diagram of a timing circuit alternate to timing circuit 104 shown in FIG. 6. Gates 210 and 218 form a flip flop to eliminate difficulties in manufacturing and testing delay element 114 shown in FIG. 6. Corresponding lines are similarly numbered on FIGS. 6 and 8. Likewise, delay element 216 functionally corresponds to delay element 118; buffers 220 and 222 functionally correspond to buffers 120 and 110, respectively; and gate 214 functionally corresponds to gate 116.

In an alternate embodiment, the functions of timing circuits 104 and 204 are accomplished with additional and different circuitry in a modification to pump driver 16 according to logic design choices familiar to those having ordinary skill in the art. In such an embodiment, the modified pump driver generates signals N1, L1, and H1 for CP1; N2, L2, and H2 for CP2; and so on for pumps CP3–4.

Practice of the present invention includes use of a method in one embodiment that includes the steps (numbered solely for convenience of reference):

(1) maintaining a first voltage on a first plate of a first capacitor while storing a first charge on a second plate of the first capacitor;

(2) stepping the voltage on the first plate of the first capacitor thereby developing a first stepped voltage on the second plate of the first capacitor;

(3) coupling the first stepped voltage to a pass transistor;

(4) maintaining a second voltage on a first plate of a second capacitor while storing a second charge on a second plate of the second capacitor;

(5) stepping the voltage on the first plate of the second capacitor thereby developing a second stepped voltage on the second plate of the second capacitor;

(6) coupling the second stepped voltage to the first plate of a third capacitor;

(7) stepping the voltage on the second plate of the third capacitor thereby developing a third stepped voltage on the first plate of the third capacitor; and (8) coupling the third stepped voltage to a control terminal of the pass transistor thereby enabling the first stepped voltage to power the circuit.

The method in one embodiment is performed using some of the components and signals shown in FIGS. 6 and 7. Cooperation of oscillator 12, pump driver 16, timing circuit 104, capacitor C4, transistor Q8, and signals H and Z accomplish step (1). Operation of timing circuit 104 to provide signal H accomplishes the operation of stepping in step (2). In step (2) the first stepped voltage is a characteristic value of signal Z. Signal Z is coupled by line 158 to transistor Q10 accomplishing step (3).

Cooperation of capacitor C1, transistor Q1 and signals M and L accomplish step (4). These components cooperate as first generating means for providing a voltage W by time T22. Cooperation of timing circuit 104 of another charge pump to provide signal L therein and consequently signal M herein accomplishes the operation of stepping in step (5). In step (5) the stepped voltage is a characteristic value of signal W.

Cooperation of timing circuit 104 of another charge pump to provide signals N and J therein and consequently signal K herein along with transistors Q2 and Q3 accomplish step (6) with respect to capacitor C3. These circuits and components cooperate as means responsive to a timing signal for selectively coupling the first generating means to a second generating means.

Cooperation of oscillator 12, pump driver 16, timing circuit 104, capacitor C3, and signal N accomplish step (7). These components cooperate as a second generating means for providing another stepped voltage. The stepped voltage is a characteristic value of signal J at time T28. The stepped voltage is outside the range of power, i.e. $V_{CC}$, and reference, i.e. GND, voltages applied to integrated circuit 8 of which charge pump 100 is a part. Finally, line 136 couples signal J to the gate of transistor Q10, accomplishing step (8).

In the method discussed above, steps 1–3 occur while steps 7–8 are occurring as shown in FIG. 7 by the partial overlap in time of signals H and N.

The foregoing description discusses preferred embodiments of the present invention, which may be changed or modified without departing from the scope of the present invention.

For example, N-channel FETs discussed above may be replaced with P-channel FETs (and vice versa) in some applications with appropriate polarity changes in controlling signals as required. Moreover, the FETs discussed above generally represent active devices which may be replaced with bipolar or other technology active devices.

Still further, those skilled in the art will understand that the logical elements described above may be formed using a wide variety of logical gates employing any polarity of input or output signals and that the logical values described above may be implemented using different voltage polarities. As an example, an AND element may be formed using an AND gate or a NAND gate when all input signals exhibit a positive logic convention or it may be formed using an OR gate or a NOR gate when all input signals exhibit a negative logic convention.

These and other changes and modifications known among those skilled in the art are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the forms disclosed. Other embodiments of the invention will be apparent in light of the disclosure to one of ordinary skill in the art to which the invention applies.

The words and phrases used in the claims are intended to be broadly construed. A "system" refers generally to electrical apparatus and includes but is not limited to a packaged integrated circuit, an unpackaged integrated circuit, a combination of packaged or unpackaged integrated circuits or both, a microprocessor, a microcontroller, a memory, a register, a flip-flop, a logic device, a charge-coupled device, combinations thereof, and equivalents.

The terms "charge pump" and "pump circuit" include, for example, a voltage doubler, a switching circuit, a voltage inverter, a level shifter, and a switching power supply whose operation includes charge storing and stepped voltage techniques.

A "signal" refers to mechanical and/or electromagnetic energy conveying information. When elements are coupled, a signal can be conveyed in any manner feasible in light of the nature of the coupling. For example, if several electrical conductors couple two elements, then the relevant signal comprises the energy on one, some, or all conductors at a given time or time period. A signal is coupled to an element regardless of intervening components when an operation of the element is responsive to the signal. When a physical property of a signal has a quantitative measure and the property is used by design to control or communicate information, then the signal is said to be characterized by having a "value." The amplitude may be instantaneous or an average. For a binary (digital) signal, the two characteristic values are called logic levels, "high" and "low."

The terms "timing" signal, "clock" signal, and "control" signal are used interchangeably in the specification and claims to meaningfully identify a particular signal without describing or limiting the function performed by the signal in any manner whatsoever. Consequently, the functions implied by the words "timing" "clocking" and "controlling" herein are equivalent.

What is claimed is:

1. An integrated circuit comprising:

a. an operational circuit; and b. a voltage generator electrically coupled to the operational circuit for providing electrical power, the voltage generator comprising a plurality of charge pumps, wherein each charge pump supplies power to the operational circuit during a portion of a duty cycle, and wherein each pump selectively enables a next charge pump of the plurality to supply power to the operational circuit during a next portion of the duty cycle, each charge pump including:

(i) a first means for storing an electrical voltage in response to a first input signal voltage;

(ii) a second means for storing an electrical voltage in response to a second input signal voltage;

(iii) a first switching means for electrically coupling the first storage means and the second storage means to create a shared voltage, the switching means being activated when the voltage of a third input signal reaches an activation level;

a third means for storing an electrical charge;

(v) a second switching means for electrically coupling the third storage means with the operational circuit, the second switching means being activated when the shared voltage of the first storage means and the second storage means reaches a desired value, wherein the value of the shared voltage over time produces a third input signal for a next charge pump.

2. The integrated circuit of claim 1 wherein each third storage means provides a substrate bias for the operational circuit.

3. The integrated circuit of claim 1 wherein:

the voltage generator receives a reference signal having a first voltage level, and a power signal having a second voltage level; and b. the voltage across each third storage means is outside the range from the first voltage level to the second voltage level when each third storage means is coupled to the operational circuit.

4. An integrated circuit comprising a voltage generator and an operational circuit, the operational circuit powered by the voltage generator, the operational circuit for performing a function of the integrated circuit, the voltage generator comprising:

a. an oscillator;

b. a plurality of pump circuits inter-coupled in a sequence having prior and next relations among pump circuits of the sequence so that a pump circuit of the sequence receives a first timing signal from a prior pump circuit of the sequence, and provides a second timing signal to a next pump circuit of the sequence, and so that the pump circuit, responsive to the oscillator, supplies power to the operational circuit at a first time and enables the next pump circuit, responsive to the second timing signal, to supply power to the operational circuit at a second time, wherein the pump circuit of the sequence comprises:

(1) a first storage means for storing a first charge;

(2) a control means, responsive to tile first timing signal, for providing the second timing signal: and (3) a transfer means, responsive to the first timing signal, for electrically coupling the first storage means to the operational circuit, thereby supplying power to the operational circuit.

5. The integrated circuit of claim 4 wherein the transfer means is further responsive to the second timing signal for electrically coupling the first storage means to the operational circuit.

6. The integrated circuit of claim 4 wherein the voltage generator receives a reference signal having a first voltage level and receives a power signal having a second voltage level, and the transfer means comprises:

a. pass means for selectively conducting charge between the first storage means and the operational circuit when enabled by a control signal;

b. a first voltage source means for providing a third voltage;

c. a second voltage source means; and d. coupling means, responsive to the first timing signal, for selectively coupling the first voltage source means to the second voltage source means for providing the control signal.

7. The integrated circuit of claim 6 wherein the control signal is characterized by having a voltage outside the range from the first voltage level to the second voltage level.

8. The integrated circuit of claim 6 wherein the pump circuit receives a third timing signal from a pump circuit prior to the prior pump circuit of the sequence, and the first voltage source means is responsive to the third timing signal.

9. The integrated circuit of claim 6 wherein:

a. the integrated circuit further comprises a clocking means, coupled in series between the oscillator and the pump circuit, for generating a first clock signal in response to a signal from tile oscillator; and b. the second voltage source means is responsive to the first clock signal.

10. The integrated circuit of claim 9 wherein:

a. the transfer means further comprises reset means for establishing an initial charge on the first storage means; and b. the clocking means generates a second clock signal for enabling the reset means.

11. The integrated circuit of claim 10 wherein the second clock signal is coupled to a next pump circuit of the next pump circuit of the sequence for enabling the transfer means of said next pump circuit of the next pump circuit.

12. An integrated circuit comprising:

a. an operational circuit;

b. a timing circuit for providing a first clock signal, a second clock signal, a third clock signal, and a fourth clock signal;

c. a first charge pump for supplying power to the operational circuit at a first time in response to the first clock signal, and for providing a first reset signal and a first control signal;

d. a second charge pump for supplying power to the operational circuit at a second time in response to tile second clock signal and the first control signal, and for providing a second reset signal and a second control signal;

e. a third charge pump, initialized in response to the first reset signal, for supplying power to tile operational circuit at a third time in response to the third clock signal and the second control signal, and for providing a third reset signal and a third control signal;

f. a fourth charge pump, initialized in response to the second reset signal, for supplying power to the operational circuit at a fourth time in response to the fourth clock signal and the third control signal, and for providing a fourth reset signal and a fourth control signal;

g. wherein the first charge pump is initialized in response to the third reset signal and supplies power in further response to the fourth control signal; and h. wherein the second charge pump is initialized in response to the fourth reset signal.

13. A method for powering a circuit, the method comprising the steps of:

charging a first storage means;

coupling the first storage means to a pass transistor for selective conduction to the circuit, the pass transistor having a control terminal;

charging a second storage means;

charging a third storage means coupling the second storage means to the third storage means to develop a stepped voltage;

and coupling the stepped voltage to the control terminal of the pass transistor, thereby selectively enabling the first storage means to power the circuit.

\* \* \* \* \*